Feb. 25, 1969   E. G. SUNDBERG   3,429,752
SHEATH FOR BATTERY ELECTRODE AND METHOD
Filed Oct. 6, 1966
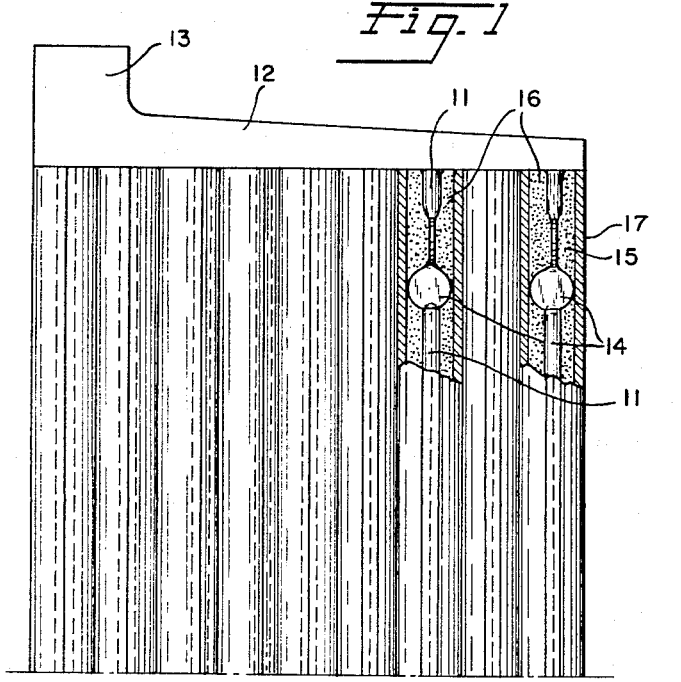
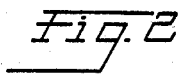
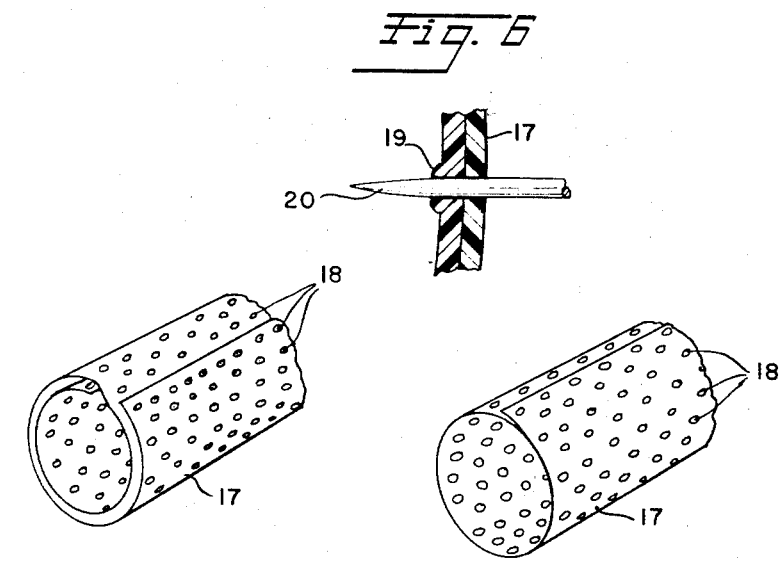
INVENTOR
ERIK GUSTAV SUNDBERG
BY
Strauch Nolan Neale Nies & Bronaugh
ATTORNEYS

United States Patent Office 3,429,752
Patented Feb. 25, 1969

3,429,752
SHEATH FOR BATTERY ELECTRODE AND METHOD
Erik Gustav Sundberg, Osbacken, Sweden, assignor to Aktiebolaget Tudor, Stockholm, Sweden, a corporation of Sweden
Filed Oct. 6, 1966, Ser. No. 584,735
Claims priority, application Sweden, Oct. 15, 1965, 13,421/65; Nov. 1, 1965, 14,063/65
U.S. Cl. 136—147      11 Claims
Int. Cl. H01m 3/02

ABSTRACT OF THE DISCLOSURE

A method of fabricating and a sheath for the active material surrounded conductive rods of a lead acid storage battery of the liquid electrolyte type in which a thin foil of plastic insulating material is formed into a tube and the walls thereof perforated with a heated needle to simultaneously provide the necessary porosity and to effect the joining of the foil layers.

---

This invention relates to lead-acid storage batteries of the type having a liquid electrolyte, negative and positive plates, and the positive plate is composed of a plurality of conductive rods surrounded by active material which in turn is surrounded by a cover or sheath of electrolyte insulating material. More particularly, this invention relates to a novel cover or sheath and method of fabrication thereof.

Prior to the present invention, the practice has been to use sheaths which were somewhat elastic and flexible. The pores in the active material swell during discharge, particularly as the battery approaches its discharge limit, which make possible the penetration of the acid into its pores. While this makes it possible for the voltage to rise somewhat and the discharge can continue further, the repeated process causes swelling of the active material and eventually a break down of the active material. This of course renders the battery inoperable.

The principal object of the present invention is to provide an electrode having a substantially longer life expectancy than has been previously achieved by providing a novel sheath which is non-yielding as compared with the volume changes of the active material during charging and discharging. The immediate advantage obtained by use of the sheaths of the present invention is that the sulfate formation is curtailed because the pores of the active material cannot expand and therefore become filled with sulfuric acid so extensively.

A further object is to provide a sheath from a thin foil of plastic material that has the essential properties of being electrolyte resistance and capable of having the required strength and porosity. It has been found that foils having a thickness on the order of 0.1 mm. may be used.

Another object is to provide in the novel sheath, apertures formed with a heated needle to produce the necessary porosity without materially weakening the tensile strength of such thin foils of plastic insulating material.

Still a further object is to provide a novel sheath and method of fabrication wherein the sheath is composed of a plurality of layers, and one and the same tool is used both for perforating the walls to provide the requisite porosity and for joining the layers together.

These and further objects will become more fully apparent from the claims, and from the description as it proceeds in conjunction with the appended drawings wherein:

FIG. 1 is a view in elevation of a typical battery electrode having parallel tubes with two of the tube covers broken away to show the interior construction;
FIG. 2 shows a section of the end tube;
FIG. 3 is a diagrammatic illustration of a tubular sheath formed in accord with the present invention;
FIG. 4 is a partial section of part of the tubular sheath of FIG. 3 showing a bead formed around the edge of the aperture;
FIG. 5 is a diagrammatic illustration of another embodiment where the tube is formed of a plurality of layers; and
FIG. 6 is a partial section of part of the tubular sheath showing the formation of a rivet like body of plastic for joining the layers together.

Referring now to the drawings, the battery electrode illustrated in FIG. 1 conventionally comprises parallel rods 11 of conductive material joined at the top by a transverse strip 12, and at the bottom by a similar transverse strip not shown. Transverse strip 12 has an upper extension 13 which is used to electrically connect several electrodes in a battery together. Rods 11 may be provided with conventional centering devices such as flattened regions 14 and 15 that are at right angles to each other. The active material 16 surrounds the conductive rods and is in turn surrounded by sheath 17.

Sheaths 17 surrounding the active material must consist of electrolyte resistant, porous or perforated material. Because it has been believed previously that the sheaths must be capable of adjusting to the volume changes of the active material during the charging and discharging periods of the galvanic cell, the various sheath constructions that have been used were yieldable. Normally this material was somewhat elastic or flexible, or slotted sufficiently to have these properties. Prior sheaths exist which consist of a perforated foil of polyvinyl chloride (PVC) coated on the inside with fiber glass. Other sheaths consist of a woven or plaited material of acid resistant yarn, which sheaths in addition can be reinforced by means of resins or mechanically by the introduction of reinforcing ribs. To the best of my knowledge, all the sheaths mentioned above and that are in commercial use, have the property of yielding to the volume changes of the active material 16 as the battery is alternately charged and discharged.

As the internal pressure on the sheaths increases with discharge due to the formation of sulfate, the stresses in tension on the sheaths during discharge periods are the largest and result in deformation of the sheaths. Investigations have shown that if the active material 16 is prevented from expanding during discharge under normal conditions, an internal pressure arises in the pores on the order of 35 to 50 atm., depending on the thickness of electrodes and other factors. Previously, such deformation was not regarded to be damaging to the operation of the battery and therefore no effort was made during fabrication of the sheath to reduce this deformation. However, it has now been recognized that the pores in the porous active material become filled with sulfate during the discharge, which leads to a widening of pores. During the subsequent charging most of this sulfate is reduced, but the size of the pores is not reduced. This produces the effect that during the next discharge still more sulfate can be formed, because more sulfuric acid can penetrate into the enlarged pores of the active material, which in turn gives rise to still greater sulfate formation, etc.

According to one feature of the invention, the active material 16 is surrounded by sheaths 17 of a non-yielding material. It is particularly important that the sheath have a resistance to deformation within the temperature range that prevails in electrode of the battery during its operation. The immediate effect obtained by means of the sheath according to the invention is, that while the discharge is somewhat curtailed, the sulfate formation is significantly reduced. This follows because if the pores in the active material cannot expand during the discharge, the penetration of the sulfuric acid is limited and the discharge stops, and hence the operable life of the battery is lengthened.

Examples of material for sheath 17 that are suitable are foils of polyesters, epoxy resins and generally the thermosetting resins, as well as thermoplastic resins under some circumstances. One particular polyester foil that is usable is polyethylene glycol terphthalate which is known under the trade name "Mylar" and is manufactured in thicknesses from 0.05 mm. and up. It is desirable that the wall thickness of sheaths of this kind must be as thin as possible, and since "Mylar" is a very tough material, it has been found especially suitable for the purpose in question.

Factors influencing the selection of a foil material for electrode sheath 17 include the ease of making such a foil penetrable to the electrolyte. Perforation with a cutting tool causes cracks to occur in the edges of the holes; these cracks reduce the strength of the remaining material to a fraction of its original strength. Since the strength and the porosity of the sheaths must both be as great as possible, it is necessary to select a compromise in order to solve two self-contradictory problems.

According to another feature of the invention this problem may be solved by perforating with pointed, thin needles heated to a temperature on the order of 200° to 500° C. depending upon the characteristics of the particular resin that is used, and the wall thickness of the sheath. It has been observed that with perforations formed in this manner, no material is actually removed from the foil, but instead the material that is displaced forms a bead 19 around each individual perforation hole as illustrated in FIGURES 3 and 4. In the case of closely spaced perforations, the beads may even merge. Quite surprisingly the foil retains a major part of its original strength after extensive perforation. Tests have shown that the strength with perforation according to the present invention is 2 to 5 times greater when compared with the same degree of perforation done with cutting tools. Another advantage is that a thinner foil can be used, which means more active material 16 can be accommodated in each electrode sheath 17 thereby increasing the capacity of the battery, and reducing the cost for the sheath.

The beads or strengthening rings 19 (see FIG. 4) that are formed on the underside of the holes after the perforation serve to reinforce the entire electrode and give it greater strength. Also, the beads 19 face and penetrate into the active material 16 and in that way constitute a reinforcement for the surface layer of the active material 16 next to the foil 17.

A further problem connected with foils of thermosetting resin is that they are somewhat difficult to join together. This difficulty may be also eliminated by joining the edges together in such a manner that the foils will fuse together in the common perforating holes. This is preferably accomplished by having foil edges overlapping each other. While the joining of foil strips into tubular sheaths may be accomplished with an adhesive, preferred method is one which can be carried out simultaneously with the perforation.

This later method of joining the ends of the foil is in effect a combination of welding and riveting. If a hole is pricked through the two or more layers of material with a very thin needle 20 at a relatively high temperature, there will be formed a hollow tubular rivet (see FIG. 6) wherein ridge 19 is similar to the rivet head, which joins the several layers of material together. Even though the walls of this rivet are relatively brittle, the rivet has high shearing strength; and since the perforations are close together, tests show that nearly the same strength can be obtained at the joint as in the foil itself. This is particularly true where the foil is in the form of a double roll as illustrated in FIG. 5. If desired, more than two layers of the foil material, if each foil layer is very thin, e.g. 0.05 mm., can be used. Where temperatures of 50° to 60° C. are reached in the battery, the thickness of a foil when the material is "Mylar" must come up to an order of magnitude of 0.08 to 0.1 mm. to be able to resist the pressure which then occurs. If the internal temperature increases even higher, then a wall thickness of perhaps 0.15 mm. may be needed.

If the battery is used in such a way and/or in such environment that no significant increase in temperature occurs, sheaths of thermoplastic material e.g. PVC can be used under the condition that they resist the pressures that occur without yielding or expanding as the active material in the battery tends to change volume. Also, the thickness of the wall of the sheath may be reduced to as little as 0.08 mm.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In a storage battery having negative and positive electrodes and a liquid electrolyte wherein one of said electrodes comprises a plurality of parallel rods of conductive material with active material surrounding each of said rods and covers surrounding said active material to retain the active material on the respective ones of each of said rods, each of said covers comprising:

a plural layer tubular sheath of plastic insulating material resistant to attack by the electrolyte, said sheath being apertured through its plural layers at spaced points around the circumference thereof, said layers being secured to each other by hollow tubular rivets of fused plastic material adjacent said apertures.

2. The storage battery as defined in claim 1 wherein the sheath material is a thermoset resin and the sheath wall thickness is less than about 0.15 mm.

3. The storage battery as defined in claim 1 wherein the sheath material is a thermoplastic resin.

4. The storage battery as defined in claim 1 wherein said sheaths are substantially non-deformable and do not materially expand at an internal pressure of at least 30 kg./cm.$^2$.

5. The storage battery as defined in claim 4 wherein the sheath with apertures has the same weight as a congruent sheath not having apertures and the plastic insulating material is polyethylene glycol terphthalate.

6. The storage battery as defined in claim 1 wherein the sheath contains ridges around each aperture and on the inside of the surface of the sheath thereby to provide reinforcing strength around each aperture.

7. The storage battery as defined in claim 1 wherein the plastic insulating material is polyethylene glycol terphthalate.

8. The method of forming an insulating sheath for an active material surrounded conductive rod of a lead acid battery of the liquid electrolyte type comprising the steps of:

(a) forming a foil layer of insulating material into a tubular shape with the ends overlapping along the length of the tube;

(b) simultaneously forming apertures for electrolyte circulation and securing the ends of the foil to each other by puncturing the overlapped ends at spaced points along the overlap with a needle heated sufficiently to cause the ends to cohere adjacent the apertures; and (c) thereafter removing the needles.

9. The method of claim 8 wherein the overlap of the ends of the foil layer is at least 360°.

10. The method as defined in claim 9 wherein said sheath consists of a thermoset resin and the temperature of the needle is between 200° and 500° C. depending upon the softening temperature of the resin and the thickness of the sheath wall, and the punctured apertures are each surrounded by a bead to thereby provide reinforcing strength around each aperture.

11. The method of claim 9 wherein the foil layer has a thickness of less than about 0.1 mm. and wherein the needles are heated sufficiently to produce apertures having a relatively hard and brittle surface with a high shearing strength and a ridge on one side wall surface of said sheath.

References Cited

UNITED STATES PATENTS

| | | | |
|---|---|---|---|
| 2,904,611 | 9/1959 | Duddy | 136—147 XR |
| 2,937,221 | 5/1960 | Lindgren | 136—145 |
| 3,265,535 | 8/1966 | Sundberg | 136—147 |

ALLEN B. CURTIS, *Primary Examiner.*

DONALD L. WALTON, *Assistant Examiner.*

U.S. Cl. X.R.

136—63, 148; 156—251; 264—154